March 5, 1940.                    E. W. NORTH                    2,192,617
                              VENETIAN BLIND CHAIN
                              Filed Oct. 20, 1938
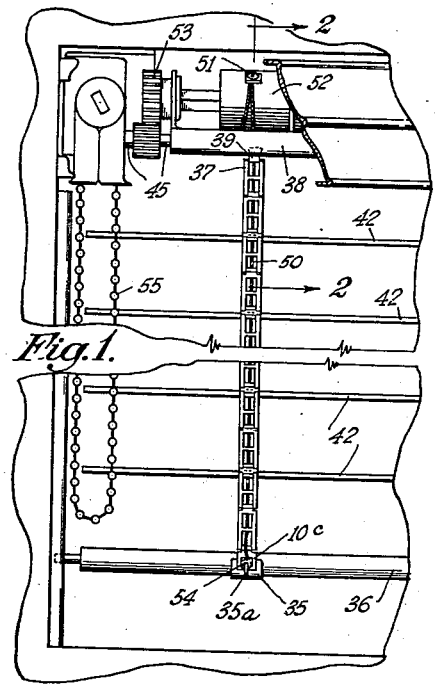
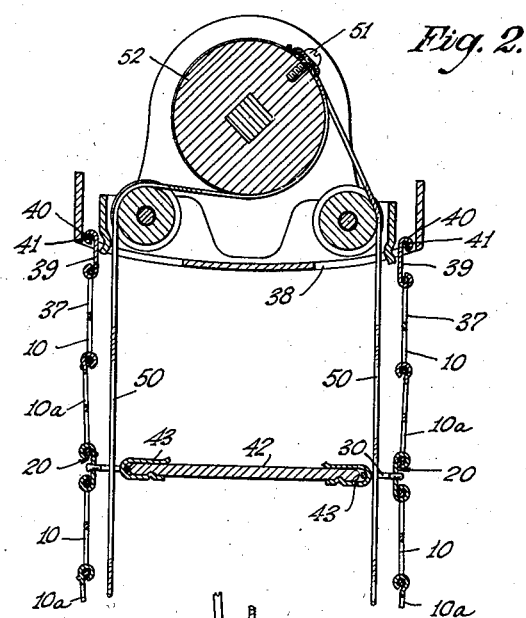
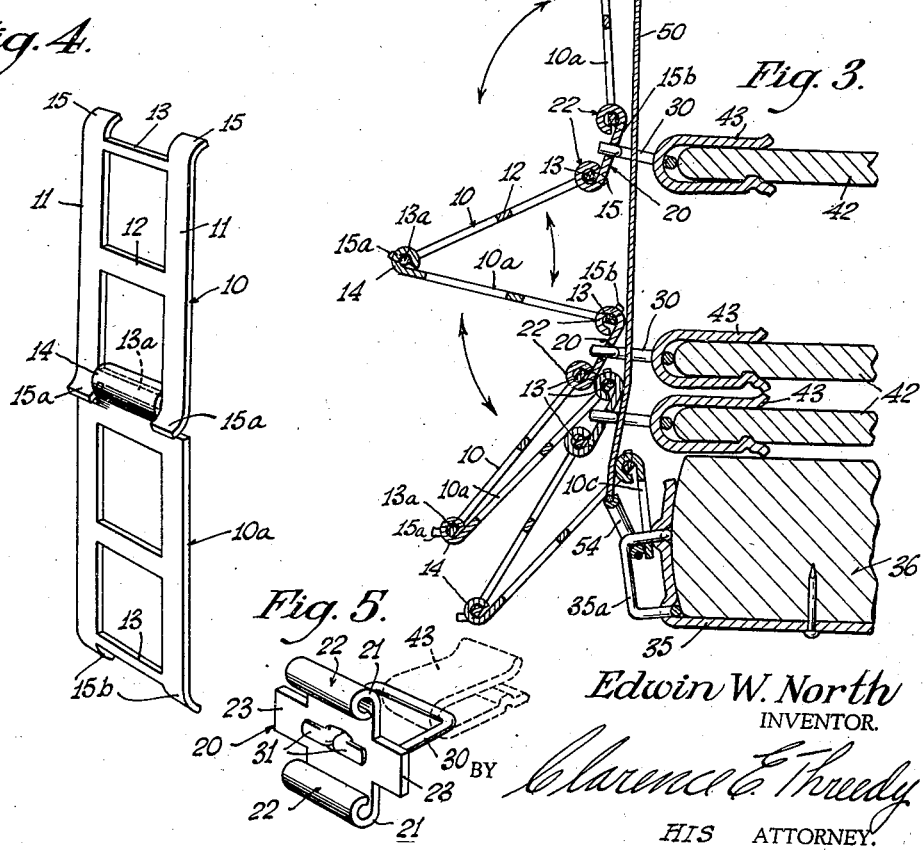
Edwin W. North
INVENTOR.
Clarence E. Threedy
HIS ATTORNEY.

Patented Mar. 5, 1940

2,192,617

UNITED STATES PATENT OFFICE 2,192,617

VENETIAN BLIND CHAIN

Edwin W. North, Rockford, Ill., assignor to National Lock Co., Rockford, Ill., a corporation of Delaware Application October 20, 1938, Serial No. 235,986

7 Claims. (Cl. 156—17)

The principal object of the present invention is the provision of an improved tilting chain especially suited for use with Venetian blinds, the chain being constructed of flat links pivotally connected in a particular manner so that the links will nest or fold back upon each other in a particular manner when the chain is bunched in the direction of its length.

Another object is the provision of a chain tape in which certain links are interconnected by a connecting link while other links are joined directly together for relative pivotal movement, and means are provided on the connecting links for attachment to blind slats.

Another object is the provision of a chain formed of links stamped from sheet metal, certain of the links being pivotally joined together and certain other of the links being connected in the chain by pivotal attachment to a connecting link, the connecting link having an eye secured rigidly thereto with its opening facing the direction of the extended length of the chain, the eye being adapted for attachment to a blind slat, and stop means being provided in the various links of the chain to limit pivotal movement thereof in certain directions whereby to effect a nesting of the chain links in a particular fashion when the chain is bunched as a result of raising the blind.

Other objects and advantages residing in the invention relate to certain details of construction, form, location and operation of the illustrative embodiment described in detail herein in view of the annexed drawing, in which:

Fig. 1 is a fragmentary front elevation of a blind structure employing the new chain tape;

Fig. 2 is an enlarged transverse section through the tilting rail and traverse roller of a blind employing the chain tape, as viewed in the direction of lines 2—2 of Fig. 1;

Fig. 3 is a fragmentary transverse section through the lower blind slats, drawn to enlarged scale, and illustrating the bunching of the chain tape;

Fig. 4 is an enlarged perspective view of the direct pivotal connection and stop means in a pair of the links; and Fig. 5 is a perspective view of a connecting link and attaching eye or loop.

The employment of substantially flat chain tapes in Venetian blind structures is known in the prior art, as is the construction of a chain having pivoted links with stop means for limiting the pivotal movement of the links in one direction, and the advance in the present invention resides particularly in the manner in which relatively flat links are interconnected in a chain for bunching or pivotal movement to effect the folding of the chain in a certain manner.

A preferred form of construction of the novel chain is illustrated in Fig. 4, wherein the links 10 are stamped from sheet metal or other relatively flat material substantially in the form of a squared figure 8 or in the form of a letter H provided with cross bars at the opposite terminals of the sides of the H. In other terms, the links are stamped so as to have opposite parallel side arms 11 joined by a reinforcing cross portion 12 with transverse pivot extensions 13 and 13a extending parallel to the central cross bar 12 near the opposite extremities of the side arms 11.

Certain links 10a, however, which are to be joined with the links 10, have a longitudinally extending ear 14 in place of the cross rib 13, which ear is folded back upon itself around the cross bar 13a of the link 10 whereby links 10 and 10a are directly connected or pivotally joined together for relative pivotal movement about an axis (13a) substantially transverse to the length of the chain.

Means for limiting the relative pivotal movement of the links 10 and 10a includes the provision of ears 15 as extensions from the opposite ends of the side arms 11 of the link 10, the ears 15 at one end of the link 10 being bent in one direction out of the plane of the link, while the ears 15a at the opposite end of the link 10 are bent in an opposite direction out of the plane of the link.

In the link 10a the upper portions adjacent the pivot extension 14 are not provided with ears, whereas the lower opposite extremities of the link 10a are provided with ears 15b bent out of the plane of the link in a direction opposite to the lower ears 15a on the link 10. Pivotal movement of the links 10 and 10a toward each other in the direction in which they face in Fig. 4 is prevented by bearing of the ears 15a against the portions of the link 10a immediately adjoining the ends of the tab 14, links of the construction of Fig. 4, however, being pivotable or foldable toward each other in the opposite direction as illustrated in Fig. 3.

The links of the chain which are not directly joined for pivotal movement in the manner described in conjunction with the arrangement of Fig. 4, are joined in the chain by a connecting link 20 (Fig. 5) in the form of a strip of sheet metal having oppositely projecting ears 21 extending in the direction of the length of the chain with their end portions folded back against each other to provide pivot sleeves 22 which embrace the cross bars 13 of appropriate chain lengths and provide a pivotal connection between said links and the connecting link. The connecting link is also provided with oppositely extending lugs 23 between the sleeves 22 which lugs constitute stopping means engageable with the cooperating stopping means 15 or 15b of the links 10 or 10a, as illustrated particularly in Fig. 3.

Means for attaching the chain to the blind slats includes an attaching loop or eye 30 (Figs. 3 and 5) formed from a filamentary material, such as steel wire, with free end portions 31 of each loop projected through a central opening in the connecting link 20, the free end portions being bent back in opposite directions to secure the loop to the link, and said free end portions being of a length adequate to bear against the sleeve portions 22 to limit any possible rotative movement of the eye or loop 30, the object of this arrangement being to maintain the loops with their openings always facing in the direction of the length of the chain. To this latter end the size of the central hole through which the free ends 31 are projected, in relation to the size or thickness of said free end portions, is such that when the ends are forced back rotative movement of the loop relative to the connecting link will be substantially prevented. However, in the event that such movement should occur for any reason, it will be limited by engagement of the free end portions with other parts of the link as aforesaid.

The cooperating stopping formations, that is, the ears 15, 15a and 15b, together with the parts of the links against which they bear in stopping operation, are so arranged that the links which are directly joined for pivotal movement, as in Fig. 4, may pivot toward each other in a particular direction (e. g., as in Fig. 3), whereas the succeeding links 10a which are joined to the set of links 10—10a first referred to by the connecting links 22, are arranged to pivot toward each other in a direction opposite to said particular direction as indicated by the tracer arrows in Fig. 3.

As a result of the foregoing opposite pivotal or folding movement of the links, the chain will bunch together, as illustrated in Fig. 3, with the links compactly folded together in opposite directions when the blind slats are raised, as will be particularly described hereinafter.

The manner of attachment of the chain in the blind structure is illustrated in Fig. 1, wherein one of the lowermost links 10c is secured to a cleat 35 applied to the edges of the bottom rail 36, while an uppermost link 37 is secured to the tilting carriage or rail 38 by means of a short link 39 (Fig. 2) similar to the connecting link 20 shown in Fig. 5, the link 39 having one of its upper sleeve portions 40 projected through an opening in the bottom of the carriage rail 38 and secured in the latter by a pin 41 extended through the sleeve portion 40.

It will be understood that the tilting chains are applied in pairs on opposite sides of the blind slats, there being at least two such pairs suitably disposed near the opposite axial ends of the slats, one such pair being illustrated in part in Fig. 2.

The individual blind slats 42 are attached to the chain tapes as illustrated particularly in Figs. 2 and 3, wherein the loops 30 are passed around the bight portion of spring attaching clips 43 which fit over the edge portions of the several slats. This arrangement permits the individual slats to pivot about the loops 30 when the slats are tilted in opposite directions responsive to a rocking of the carriage rail 38 about its pivotal axis 45 (Fig. 1).

The nesting or hoisting of the blind slats is accomplished by the provision of wire cables 50 (Figs. 2 and 3) which are attached at their upper ends, as at 51, to the periphery of a traverse winding roller 52 which is mounted on the carriage 38 for both rotative and axial sliding movement in response to manipulation of the gear means 53. At their lower ends the cables 50 are attached to eyes 54 (Figs. 1 and 3) which in turn are fitted around the eye portion 35a of the cleat 35.

By manipulation of the chain 55 (Fig. 1), the gear mechanism 53 will be actuated to effect rotation of the roller 52 with a consequent winding thereon of the cables 50 and a hoisting of the lowermost rail or slat 36, so that the overlying blind slats 42 will be bunched together one by one as illustrated in Fig. 3, which in turn will effect a folding or bunching of the chain tape in the manner heretofore described.

The improved chain tape because of its relative flat construction and because of the neat and efficient manner in which the links are nested together, and because of its durability and supporting strength, provides a slat supporting means which is much more suitable than other types, and it will be appreciated that the objects, advantages and economies of the invention may be realized by other forms of construction than that specifically described herein for purposes of illustration, it being a condition of this disclosure that all equivalent arrangements are to be included within the scope of the invention as defined in the appended claims.

Having thus described my invention, what I claim as new and desire to protect by Letters Patent is:

1. A folding chain composed of main links and connecting links pivotally joined for relative movement about axes transverse to the length of the chain, said link members being provided with coacting movement limiting means arranged to limit pivotal movement thereof in a manner to permit pivotal movement of the main links only in opposite directions, whereby to provide for folding movement of said main links alternately in opposite directions when the chain is folded up in the direction of its length.

2. A folding chain composed of link members pivotally connected together in series with the links alternately pivoted on each other and alternately pivoted on a shorter connecting link, and coacting means on all of said link members for limiting the relative pivotal movement thereof so that the link members which are pivoted to each other may fold toward each other in one direction while the link members which are joined to said connecting links may fold toward each other only in the opposite direction, whereby said link members are disposed for folding movement alternately in opposite directions so that all of the link members may be bunched together on one side of a line parallel to the length of the chain in its extended condition with the links all extending in the same general direction.

3. A folding chain for use with Venetian blinds, said chain being formed of a plurality of links certain of which are pivoted on each other and provided with coacting stop means preventing relative pivotal movement thereof in one particular direction beyond a center line substantially coincident with the length of the chain in its linearly extended condition, the remaining links of the chain being joined by pivotal attachment to a shorter connecting link, said remaining links and the corresponding connecting links having coacting stop means for preventing relative pivotal movement thereof in a direction opposite to said particular direction beyond said center line, said chain being attached at its uppermost extremity to a relatively stationary blind member and at its lower end to a relatively movable blind member, and means attached to said connecting links for supportably engaging blind slats.

4. A chain comprising a series of links which are directly joined for pivotal movement at one of their ends to another link and at their opposite ends to a connecting link, all of said links being provided with stop means arranged to permit pivotal movement of the directly joined links in only one direction toward each other from an extended condition, and to permit pivotal movement of the links, which are joined by connecting links, toward each other from an extended condition only in a direction opposite to that permitted the directly joined links.

5. In a Venetian blind, a tilting chain comprising flat substantially elongated links which are pivotally joined to each other at one of their ends and which are pivotally joined at their respective opposite ends to a connecting link, all of said links being pivotable about axes substantially transverse to the length of the chain in extended condition, said links which are joined to each other being provided with coacting stop means arranged to prevent pivotal movement of said links toward each other in one particular direction when said links are in relatively extended condition, said links which are joined to a connecting link being provided with stop means coacting with their respective connecting links to prevent relative pivotal movement thereof oppositely to said particular direction from relatively extended condition, and attaching means extended substantially rigidly from said connecting links and laterally of the pivotal axes thereof for attachment to blind slats disposed between top and bottom blind members, the endmost links of said chain being respectively attached to said top and bottom blind members, said links all folding together on one side of a substantially vertical line when said bottom blind member is raised to nest the intervening slats.

6. A straight hanging chain for use with Venetian blinds, said chain consisting of a plurality of flat links pivotally connected to each other in pairs, said pairs of links being pivotally joined by a connecting link of shorter length than the other links, means on said connecting links for attachment with blind slats and coacting stop means on all of the links arranged to cause the links in each said pair to fold toward each other and lie with each pair of folded links nested closely against the adjoining pair and extending in a direction downwardly away from said slats.

7. A straight hanging chain for use with Venetian blinds and consisting of main links stamped from sheet metal in a figure-eight configuration, and each having an integral body portion extending from one end and turned back upon itself about an endwise cross bar of an adjoining main link for pivotal connection with the latter, said pivotally connected main links being joined in the series by shorter connecting links, each of said main links having endwise ears offset for stopping engagement with the adjoining link and so arranged that said main links can pivot toward each other in only one direction and the pairs of main links can pivot toward each other only in an opposite direction about the corresponding connecting links, and means on said connecting links for attachment to blind slats.

EDWIN W. NORTH.